March 24, 1942.　　　F. C. CRAWFORD　　　2,277,307
PISTON RING
Filed June 10, 1939　　　2 Sheets-Sheet 1
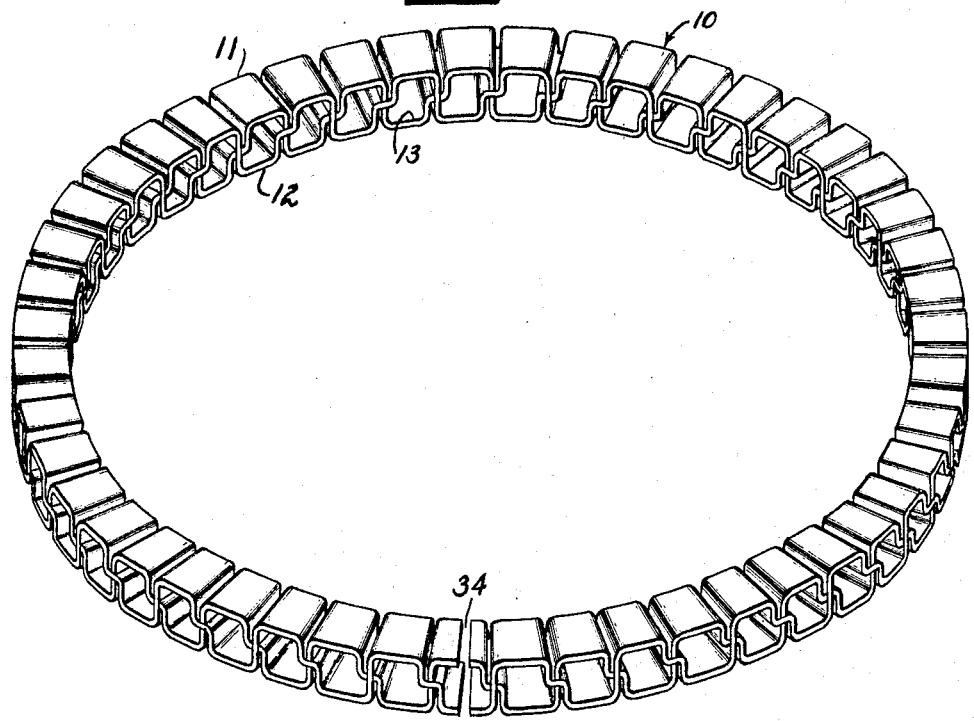
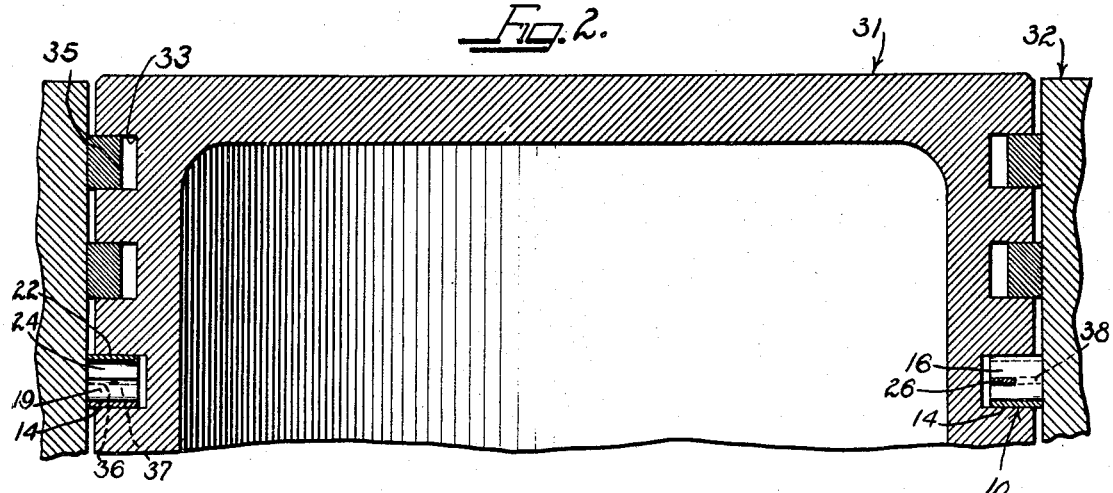
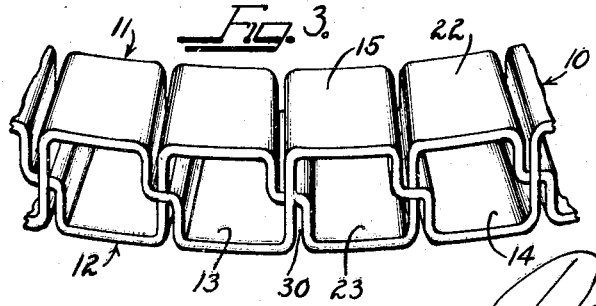
Inventor
FREDERICK C. CRAWFORD
by Charles A. Shill
Attys.

March 24, 1942.   F. C. CRAWFORD   2,277,307
PISTON RING
Filed June 10, 1939   2 Sheets-Sheet 2
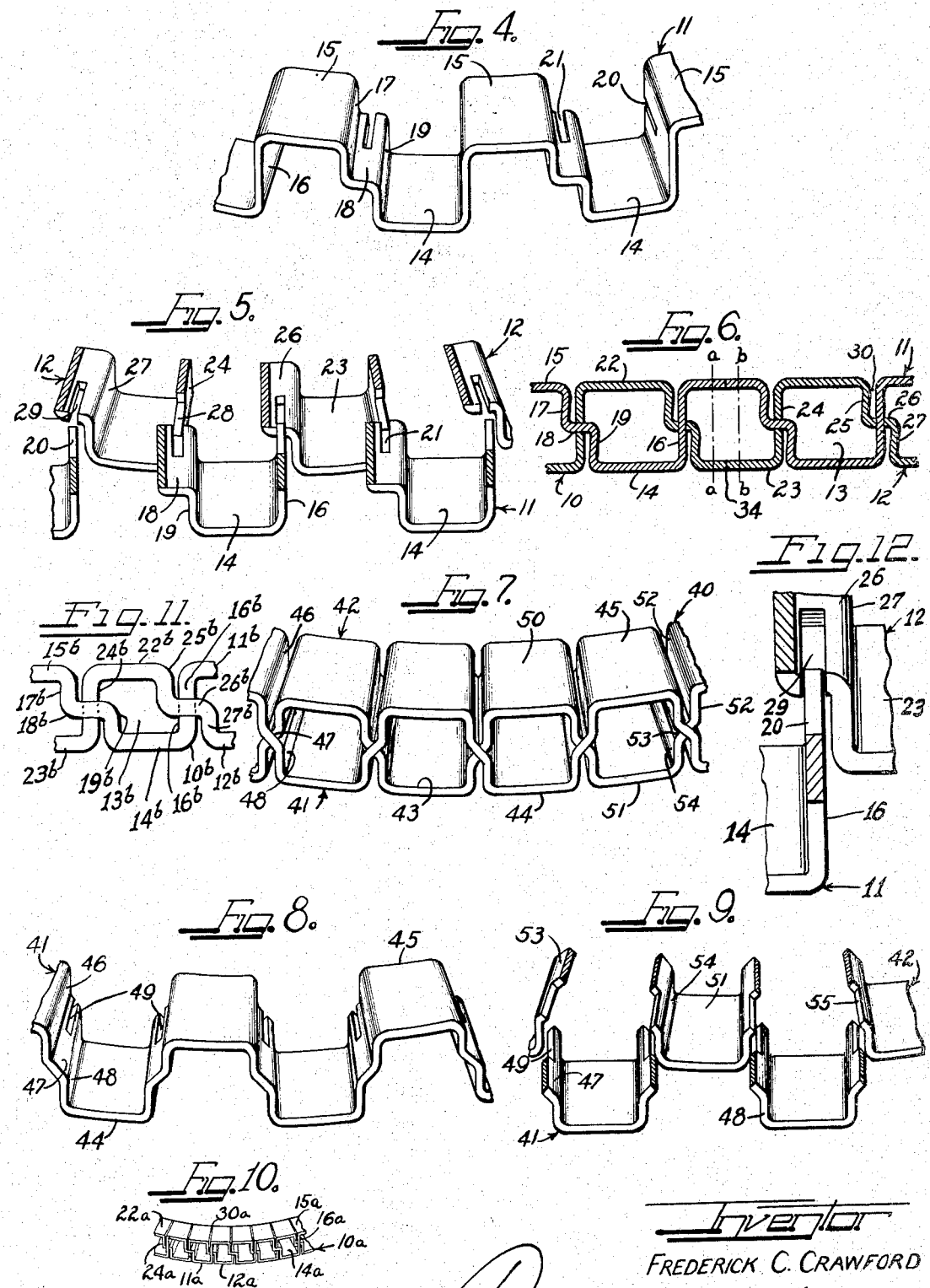
Inventor
FREDERICK C. CRAWFORD Patented Mar. 24, 1942

2,277,307

UNITED STATES PATENT OFFICE 2,277,307

PISTON RING

Frederick C. Crawford, Cleveland, Ohio, assignor to Thompson Products, Incorporated, Cleveland, Ohio, a corporation of Ohio Application June 10, 1939, Serial No. 278,432

15 Claims. (Cl. 309—45)

This invention relates to packing rings. More particularly it relates to a circumferentially resilient piston ring comprising two annular internesting corrugated metal strips forming tubular radial oil passages.

It has heretofore been proposed to fabricate a circumferentially compressible piston ring having radial oil passages from a single corrugated metal strip. The prior art is also acquainted with circumferentially compressible piston rings composed of a plurality of tubes secured together radially as well as with circumferentially compressible piston rings formed from two matching corrugated metal strips superimposed axially and welded together so as to form radial oil passages.

The present invention departs radically from the prior art by contemplating a circumferentially and axially resilient piston ring comprising two radially internesting corrugated metal strips which while closely interfitting still are movable with respect to one another. Each metal strip is provided with radial roughly square corrugations which open alternately at the top and bottom of the strip. The vertical wall sections of the corrugations are bent and slotted to permit mutual radial interpenetration of two corrugated strips staggered circumferentially so that the roughly square corrugations of the mated strips complement each other to form tubularly closed radial oil passages. The result is a piston ring in which the top and bottom surfaces consist of series of distinct segments furnished alternately by the two strips.

It is therefore an important object of this invention to provide a circumferentially and axially resilient piston ring comprising two radially interpenetrating corrugated metal strips which while closely interfitting still are movable with respect to one another.

Another important object of the present invention is to provide a piston ring comprising two corrugated circumferentially staggered metal strips complementing each other to form tubular radial oil passages.

A further important object of this invention is to provide a double strip piston ring in which the top and bottom surfaces consist of series of segments furnished alternately by two radially internesting corrugated metal strips.

Other and further important objects of this invention will be apparent from the disclosures in the specification and the accompanying drawings.

This invention (in a preferred form) is illustrated in the drawings and hereinafter more fully described.

In the drawings:

Figure 1 is a perspective view of an assembled piston ring embodying the principles of this invention.

Figure 2 is a vertical sectional view taken through the cylinder and piston of an internal combustion engine showing transverse sections of the ring of Figure 1 in position in a piston groove.

Figure 3 is a fragmentary enlarged perspective view of the ring of Figure 1.

Figure 4 is a fragmentary enlarged perspective view of one of the corrugated annular strips of which the ring of Figure 1 is composed.

Figure 5 is a fragmentary enlarged perspective view of an intermediate stage in the assemblage of the ring of Figure 1 from two corrugated annular strips.

Figure 6 is a fragmentary enlarged lateral view from the outside of the ring of Figure 1 in compressed position.

Figure 7 is a fragmentary enlarged perspective view of another ring illustrating the principles of the present invention.

Figure 8 is a fragmentary enlarged perspective view of one of the corrugated annular strips of which the ring of Figure 7 is composed.

Figure 9 is a fragmentary enlarged perspective view of an intermediate stage in the assemblage of the ring of Figure 7 from two corrugated annular strips.

Figure 10 is a perspective fragmentary view drawn approximately to scale of a modification of the ring of Figure 1.

Figure 11 is a fragmentary enlarged lateral view from the outside of a ring similar to the ring of Figure 1 formed by strips of metal having a cross sectional area around each oil passage greater than the cross sectional area of said oil passage.

Figure 12 is a greatly enlarged fragmentary view of an intermediate stage in the assemblage of the ring of Figure 1 from two corrugated annular strips showing the mutual fitting of the two strips into slots therein.

As shown on the drawings:

In Figures 1, 3 and 6 the reference numeral 10 indicates generally a piston ring embodying the principles of the present invention. This ring is formed by two radially internesting corrugated annular strips 11 and 12. The corrugations in the strip 11 are staggered circumferentially with respect to those in the strip 12 to complementarily with the latter define tubularly closed radial oil passages 13.

As shown in the representation of the annular strip 11 in Figure 4 and in the representation of both strips 11 and 12 in Figure 5, the corrugations in the strip 11 include lower horizontal segments 14 alternating with upper horizontal segments 15. Each upper horizontal segment 15 is connected to the lower horizontal segment 14 to its left by a vertical wall 16 and to the lower horizontal segment 14 to its right by a wall comprising an upper vertical segment 17, an intermediate horizontal cross-over segment 18 and a lower vertical segment 19. All these corrugations extend radially to the strip 11, i. e., if projected inwardly, their projections would converge to meet at the center of the annular strip 11.

A central radial slot 20 extends half way across the vertical wall 16 from the inside. The cross-over segment 18 is similarly slotted at 21. The slots 20 and 21 are cut to fit closely yet movably over a strip of metal of the same thickness as the strip 11.

The strip 12 has the same dimensions as the strip 11. As shown in Figures 5 and 6 it is also corrugated similarly, having upper horizontal segments 22 and lower horizontal segments 23 connected alternately by vertical walls 24 and by walls having upper vertical segments 25, intermediate cross-over segments 26 and lower vertical segments 27.

As may be seen in Figure 5 the strip 12 is slotted similarly to the strip 11, at 28 and 29, but the latter slots extend from the outside inwardly.

The assemblage of the two strips 11 and 12 is illustrated in Figure 5. The slot 20, being situated at the same height as the slot 29, will fit over the part of the cross-over segment 26 which lies in a projection of the slot 29 all the way across the strip 12, while the slot 29 will fit over the part of the vertical wall 16 lying in a projection of the slot 20 across the strip 11. Similarly the slots 21 and 28 will coact with the vertical wall 24 and the cross-over segment 18 to form a close fitting but not locking joint.

A joint formed by the fitting of the slot 29 over the vertical wall 16 is illustrated in greater detail in Figure 12 which shows the slightly larger size of the slot as compared to the wall segment necessary to effect the close fitting but not locking joint disclosed in the preceding paragraph.

As shown by the representation of the assembled ring 10 in Figure 3, the plane upper surface of the ring is formed alternately by the upper horizontal segments 15 of the strip 11 and by the upper horizontal segments 22 of the strip 12, while the lower plane surface of the ring is formed alternately by the lower horizontal segments 14 and 23 of the two strips 11 and 12. The upper and lower plane surfaces of the ring 10 thus consist of series of distinct segments separated by gaps. The latter are indicated by the reference numeral 30.

Figure 2 represents a piston 31 in a cylinder 32 of an internal combustion engine. Piston grooves 33 are provided for piston rings 35 of conventional type and for the piston ring 10 described hereinabove. The transverse section through the ring 10 shown to the left of Figure 2 is taken through a plane intersecting the horizontal wall segments 14 and 22 at lines spaced from and intermediate the vertical wall sections 19 and 25. A dotted line 36 indicates the lower surface of the cross-over section 18. Another dotted line 37 represents the abutting terminal surfaces of the slots 21 and 28.

The transverse section through the ring 10 shown to the right of Figure 2 is taken through a plane intersecting the horizontal wall section 14 flush with that face of the vertical wall 16 facing the gap 30. Dotted lines 38 represent the slot 29.

The ring 10 is suitably but not necessarily split, for instance, at 34. This splitting may be effected at any stage of the fabrication of the ring.

The strips 11 and 12 are fabricated from resilient sheet metal. They, and consequently also the ring 10, are therefore capable both of axial and circumferential spring action. Figure 6 illustrates how circumferential compression of the ring 10 is effected by bending the vertical wall segments 17 and 19 toward the wall 24 and by bending the wall segments 25 and 27 toward the wall 16, whereby the distance across the gaps 30 is diminished. This bending being an elastic deformation, the ring strives to resume its original length, thereby exerting a force directed both radially and circumferentially.

The ring 10 is normally compressed circumferentially when mounted as shown in Figure 2 in the groove 33 of the piston 31 within the cylinder 32 of an internal combustion engine. This compressed position is suitably effected by the use of a ring having a circumference when fully expanded slightly longer than that of the inside of the cylinder 32. The ring 10 must then be compressed to permit the insertion of the piston on which it is mounted. After insertion the ring will attempt to expand to its normal circumferential length thus forcing the terminal surfaces at the split 34 against each other, as shown in Figure 6, and also forcing the outer lateral surface of the ring against the inside face of the cylinder 32. This spring action causing circumferential and radial pressure by the circumferentially compressed ring is due to the separately and independently effective elasticities of the two strips 11 and 12 in the ring 10 which are internested but not interlocked.

The sole limitation in the positioning of the split 34 is that it be intermediate and spaced from the cross-over segments 18 and 26. Lines a—a and b—b in Figure 6 indicate planes intersecting the ring 10 transversely along which the ring may also be split. If desired the split may be widened to form a gap, as shown in Figure 1, by grinding or otherwise removing parts of the horizontal wall segments intersected by the split. For instance, the portions of the wall segments 15 and 23 intermediate the lines a—a and b—b may be removed. The edges of such a gap must be intermediate and spaced from the cross-over segments 18 and 26. This and the similar limitation of the positioning of the simple split 34 insure that stumps of the horizontal wall segments shall project beyond the cross-over segments 18 and 26 to provide terminal surfaces adapted for mutual abutment.

Since widening the split 34 to a gap involves the removal of a portion of the circumference of ring 10, the same is shortened thereby. Hence an oversize ring may be made to fit a piston for which it would be too large if simply split. Nor is it necessary to carry the grinding or other process to a definite end point matching exactly the circumference of the piston to be fitted, for there is a range of operative circumferential lengths of piston rings with respect to any one piston. This is due to the elasticity of the compressed ring compensating for limited variations in circumferential length.

Figure 7 depicts another piston ring 40 embodying the principles of the present invention. The ring 40 is formed by two radially internesting corrugated annular strips 41 and 42. As in the ring 10, the roughly square corrugations of the two mating strips are staggered circumferentially with respect to one another to complementarily define tubularly closed radial oil passages 43.

As shown in the representation of the annular strip 41 in Figure 8 and in the representation of both strips 41 and 42 in Figure 9, the corrugations in the strip 41 include lower horizontal segments 44 alternating with upper horizontal segments 45. The ring 40 differs from the ring 10 by having each upper segment 45 connected alike to both lower segments 14 adjacent thereto by walls comprising upper vertical segments 46, intermediate cross-over segments 47 forming an angle of 135° with the vertical segments 46, and lower vertical segments 48. A central radial slot 49 extends half way across each cross-over segment 47 from the inside.

The strip 42 is dimensioned and corrugated similarly to the strip 41, having upper horizontal segments 50 alternating with lower horizontal segments 51 joined by walls comprising upper vertical segments 52, intermediate cross-over segments 53 forming an angle of 135° therewith, and lower vertical segments 54. Each cross-over segment 53 is centrally and radially slotted half way across from the outside at 55.

The two strips 41 and 42 may be assembled as shown in Figure 9 to form the ring 40 similarly to the assemblage of the ring 10 described in connection with Figure 5.

The ring 40 may be split similarly to the ring 10.

In Figures 1 to 9 the corrugations in the various strips are shown as rounded at transitions from horizontal to vertical wall segments. In Figure 4, for instance, there is a rounded transition from the upper horizontal wall segment 15 to the vertical wall segment 16. Figure 10 represents a variant of the ring 10 indicated generally by the reference numeral 10a formed by annular strips 11a and 12a which are corrugated so as to form sharp corners in place of rounded transitions. The strip 11a comprises vertical walls 16a connecting upper horizontal wall segments 15a with lower horizontal wall segments 14a. The strip 12a includes vertical wall segments 24a continuing horizontal upper wall segments 22a downwardly and defining together with the vertical walls 16a gaps 30a. Due to the sharp-cornered corrugation of the strips 11a and 12a it is possible to space the wall segments 24a closely adjacent to the walls 16a to diminish the width of the gaps 30a. The same applies to similar gaps in the bottom plane surface of the ring 10a. When this ring is compressed circumferentially, the gaps in the plane surfaces thereof are closed at these plane surfaces by the approach and engagement of the facing walls of said gaps. Consequently the ring 10a will show upper and lower plane surfaces formed by contacting separate segments furnished alternately by two radially internesting corrugated strips.

Figure 11 shows another ring similar to the ring of Figure 1 but formed of strips of such thickness that the total cross sectional area of strips surrounding each oil passage exceeds the cross sectional area of the oil passage. The ring of Figure 11 is designated generally by the reference numeral 10b. Other parts thereof are designated similarly to corresponding parts shown in Figures 1, 5 and 6, the letter *b* being added to the reference numeral to distinguish the reference numerals of Figure 11 from those of Figures 1, 5 and 6.

The above disclosed piston rings are illustrative examples of the applications of the principles of the present invention. Many other embodiments thereof are possible.

If the surfaces of the slots cut in the strips making up the composite piston rings of the present invention are cut normally to the surfaces of said strips, it follows that the two strips must intersect at an angle of 90° in the assembled ring. For ring 10 this 90° angle is derived at each intersection solely from one strip, the two strips alternating by accommodating successive intersections. In ring 40 the 90° angle is derived at each intersection jointly in equal parts from the two strips. Obviously numerous intermediate constructions are possible. It is also feasible to cut the slots in the strips otherwise than normally to the plane of the strips, whereby other angles of intersection than 90° may be realized.

If desired the slots in one of the making strips may extend more than half way across the strip. In this case the length of the slot in the other strip must be diminished correspondingly. The slotted and bent cross-over segments need further not be positioned exactly half way between the upper and lower plane surfaces of the strips, nor is it necessary to make all the corrugations in one strip alike.

These and many other structural variations are possible without departing from the principles of the present invention which contemplates broadly a piston ring formed by two radially corrugated repeatedly intercrossing annular strips of resilient sheet metal presenting their edges as lateral wearing surfaces. The roughly square corrugations of the two strips are staggered circumferentially to complementarily form tubularly closed radial oil passages, one strip forming the roof and another the bottom of each passage. The vertical wall segments connecting the alternating upper and lower horizontal segments of the strips are suitably bent and slotted radially to form cross-over segments coacting to effect complete interpenetration and interfitting which while close does not prevent independent movement of the two strips.

In other words, the rings of the present invention comprise two similarly dimensioned and radially corrugated repeatedly intercrossing annular strips of resilient sheet metal facing in opposite axial directions. The intercrossing is effected at points intermediate the upper and lower segments of the corrugations by radially slotting and bending the strips therebetween. The combined length of a slot in one strip and that of a slot in the other strip is equal to the width of the ring. Slots in one strip open inwardly, in the other strip outwardly, coacting slots in the two strips being positioned at the same axial height. The angle at which the strip segments intermediate the upper and lower segments of the corrugations are bent is a function of the angle at which the slots intersect the surfaces of the strips.

Piston rings according to the present invention are easily fabricated by corrugating, slotting, assembling and, optionally, splitting annular strips of resilient sheet metal. The strips, and consequently also the assembled rings, are axially resilient. When compressed circumferentially, they exert a circumferentially and also a radially directed force. The magnitude of the latter is approximately equal over the circumference of the strips.

In working position both the strips of an assembled ring are independently urged against the inner face of the cylinder with equal force at all points. The outer edges of the two strips form a double oil seal with a large scraping area equal to the combined cross-sectional areas of the two strips. This scraping area is suitably made larger than the cross-sectional area of the radial oil passages defined by the complementarily staggered corrugations of the strips which serve to equalize the pressures at the inside and outside lateral surfaces of the ring.

The radial and circumferential spring action of the rings of the present invention when compressed coupled with the fact that the rings may be shortened facilitate the fitting of any given piston and compensate for changes in dimension of piston or cylinder by wear.

It will thus be seen that my structurally novel piston ring is distinguished by ease of fabrication, ease of fitting to pistons and cylinders, and effective functioning. It has been pointed out hereinabove that details of construction may be varied through a wide range without departing from the principles of this invention and it is, therefore, not the purpose to limit the patent granted hereon otherwise than necessitated by the scope of the appended claims.

I claim as my invention:

1. A packing ring comprising interpenetrating radially corrugated annular strips of resilient sheet metal.

2. A piston ring comprising two interpenetrating, closely fitting, relatively movable radially corrugated annular strips of resilient sheet metal staggered circumferentially to provide tubular radial oil passages.

3. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages.

4. A piston ring comprising two radially corrugated annular strips of resilient sheet metal having alternate upper and lower horizontal plane segments with slotted interpenetrating cross-over segments therebetween.

5. A piston ring comprising two similarly dimensioned and radially corrugated annular strips of sheet metal facing in opposite axial directions, said strips having alternate upper and lower horizontal plane segments with radially slotted and bent cross-over segments therebetween, the slots in said two strips opening in opposite directions to permit repeated intercrossing of said two strips.

6. A piston ring comprising two similarly dimensioned and radially corrugated annular strips of resilient sheet metal radially slotted and bent intermediate the upper and lower planes of said corrugations, the upper planes of said two strips being staggered circumferentially and said two strips intercrossing repeatedly through said slots.

7. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and said cross-over segments being slotted to effect a close interfitting that will still permit relative movement of said strips.

8. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and the slots in said cross-over segments intersecting the latter at an angle of about 90°.

9. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages and alternate segments of the strips connecting upper and lower horizontal segments being bent to comprise central horizontal segments.

10. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and all said cross-over segments being alike bent over an angle of about 45°.

11. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and said cross-over segments being slotted halfway across.

12. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages and the corrugations of said strips being sharp cornered.

13. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and the total cross sectional area of said strips around each oil passage being greater than the cross sectional area of said oil passage.

14. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, the corrugations of said strips being sharp cornered and the spacing of the cross-over segments being so close that when said ring is compressed circumferentially in the cylinder of an internal combustion engine the upper and lower plane surfaces of said ring are composed of series of contiguous plane segments furnished alternately by the two strips.

15. A piston ring comprising two similarly dimensioned and radially corrugated annular strips of resilient sheet metal facing in opposite axial directions and having upper and lower horizontal plane segments with radially bent and slotted cross-over segments therebetween adapted to permit intercrossing of said strips, said strips repeatedly intercrossing intermediate said upper and lower planes to define a plurality of tubularly closed radial oil passages, and said ring being split at points intermediate and spaced from said cross-over segments.

FREDERICK C. CRAWFORD.